(12) United States Patent
Bajaj et al.

(10) Patent No.: US 7,673,231 B2
(45) Date of Patent: Mar. 2, 2010

(54) OPTIMIZED MARKUP LANGUAGE PROCESSING USING REPEATED STRUCTURES IN MARKUP LANGUAGE SOURCE

(75) Inventors: Neeraj Bajaj, Rohtak (IN); K. Venugopal Rao, Bangalore (IN)

(73) Assignee: Sun Microsystems, Inc., Santa Clara, CA (US)

( * ) Notice: Subject to any disclaimer, the term of this patent is extended or adjusted under 35 U.S.C. 154(b) by 1009 days.

(21) Appl. No.: 11/220,812

(22) Filed: Sep. 6, 2005

(65) Prior Publication Data

US 2006/0294119 A1 Dec. 28, 2006

(30) Foreign Application Priority Data

Jun. 24, 2005 (IN) .......................... 556/KOL/2005

(51) Int. Cl.
G06F 17/00 (2006.01)
(52) U.S. Cl. ....................................... 715/237; 715/234
(58) Field of Classification Search .................. 715/237
See application file for complete search history.

(56) References Cited

U.S. PATENT DOCUMENTS

| | | | |
|---|---|---|---|
| 6,490,591 B1 * | 12/2002 | Denbar et al. ............... | 707/101 |
| 6,763,499 B1 | 7/2004 | Friedman et al. | |
| 2004/0093347 A1 * | 5/2004 | Dada ...................... | 707/103 R |
| 2004/0123273 A1 * | 6/2004 | Hammerich et al. ........ | 717/126 |
| 2004/0210599 A1 | 10/2004 | Friedman et al. | |

OTHER PUBLICATIONS

Takase, Toshiro An Adpative, Fast, and Safe XML Parser Based on Byte Sequences Memorization, May 2005,World Wide Web Conference, p. 692-700.*

Biswadeep Nag, "Acceleration Techniques for XML Processors," printed from http://www.idealliance.org/proceedings/xml04/papers/246/xml-accel.html, p. 1-17.

* cited by examiner

*Primary Examiner*—Joshua D Campbell
*Assistant Examiner*—Christopher Bryant
(74) *Attorney, Agent, or Firm*—Dorsey & Whitney LLP

(57) ABSTRACT

A computer-implemented method of parsing markup-language source data is described. The markup-language source data comprises a plurality of elements. A first portion of the elements is processed by interoperating with a symbol table to determine unique string objects associated with the elements of the first portion of the elements. A structure is recorded associated with the first portion of the elements collectively, including the determined unique string objects in association with the corresponding elements of the first portion. A second portion of the elements is processed, using the structure determined associated with the first portion of the elements, to determine the unique string objects associated with the elements of the second portion, without interoperating with the symbol table.

15 Claims, 5 Drawing Sheets

```
FLOWCHART OF
NEW GET_STRINGOBJECT

Invoke Processing in Stage 1 or Stage 2, as Indicated 100 (Stage 1):
    102. check each character of start tag string is valid
         XML character per XML 1.0 specification.
    104. check symbol table for start tag string
    106.
        a. if string object for start tag string is present
           in symbol table, then return already-present
           string object;
        b. otherwise, create new object for start tag string
           in symbol table.
        c. populate data structure with string, depth and
           link to string object (string object is in Symbol
           Table).  (Increase depth value as start element
           is encountered and decrease depth value as end
           element is encountered).
        d. If particular condition is met, indicate further
           invocations of Get_String-Object processing is in
           Stage 2.

200 (Stage 2):
    202:  Predict next start tag string to be read using
          data structure entries.
    204:  Compare predicted next start tag string with
          character sequence from the character buffer
          (Fig. 2).
    206:  If match, then skip that number of characters in
          the character buffer.
    208:  If no match, then indicate and revert to Stage 1
          processing (checking validity of XML names and
          using SymbolTable).
```

```
<table>
  <row>
    <id>0000</id>
    <firstname>Al</firstname>
    <lastname>Aranow</lastname>
    <street>1 Any St.</street>
    <city>Anytown</city>
    <state>AL</state>
    <zip>22000</zip>
  </row>

<row>
    <id>0001</id>
    <firstname>Bob</firstname>
    <lastname>Aranow</lastname>
    <street>2 Any St.</street>
    <city>Anytown</city>
    <state>AL</state>
    <zip>22000</zip>
  </row>
</table>
```

FIG. 1 (Input Source File)

```
<table><row><id>0000</id><firstname>Al</firstname><lastname>Aranow</lastname><street>1 Any St.</street><city>Anytown</city><state>AL</state><zip>22000</zip></row><row><id>0001</id><firstname>Bob</firstname><lastname>Aranow</lastname><street>2 Any St.</street><city>Anytown</city><state>AL</state><zip>22000</zip></row>
```

FIG. 2 (Contents of Character Array Buffer)

FIG. 3 (Prior Art Parsing Flow)

main XML parser program
1. load XML stream into character array buffer
2. process stream until detect new element;
3. new_element: process_element()
4. process until detect new element or done
   a. if new element, then go to new_element.

process_element:
1. read start tag for element;
2. get_stringobject (start tag string for element);
3. push string object for element onto stack.
4. process until detect new element or detect end of element;
   a. if detect new element, then process_element;
   b. if detect end of element, then pop string object for element from element stack and return.

get_stringobject:
1. check each character of start tag string is valid XML character per XML 1.0 specification.
2. check symbol table for start tag string
3.
   a. if string object for start tag string is present in symbol table, then return already-present string object;
   b. otherwise, create new object for start tag string in symbol table.

FIG. 4 (Array Data Structure)

| Position | Start Tag String | Depth | Link to String Object |
|---|---|---|---|
| 0 | table | 1 | link to object for "table" |
| 1 | row | 2 | link to object for "row" |
| 2 | id | 3 | link to object for "id" |
| 3 | firstname | 3 | link to object for "firstname" |
| 4 | lastname | 3 | link to object for "lastname" |
| 5 | street | 3 | link to object for "street" |
| 6 | city | 3 | link to object for "city" |
| 7 | state | 3 | link to object for "state" |
| 8 | zip | 3 | link to object for "zip" |
| 9 | | | |
| 10 | | | |

FIG. 5 – FLOWCHART OF NEW GET_STRINGOBJECT

Invoke Processing in Stage 1 or Stage 2, as Indicated 100 (Stage 1):
    102. check each character of start tag string is valid XML character per XML 1.0 specification.
    104. check symbol table for start tag string
    106.
        a. if string object for start tag string is present in symbol table, then return already-present string object;
        b. otherwise, create new object for start tag string in symbol table.
        c. populate data structure with string, depth and link to string object (string object is in Symbol Table). (Increase depth value as start element is encountered and decrease depth value as end element is encountered).
        d. If particular condition is met, indicate further invocations of Get_String-Object processing is in Stage 2.

200 (Stage 2):
    202: Predict next start tag string to be read using data structure entries.
    204: Compare predicted next start tag string with character sequence from the character buffer (Fig. 2).
    206: If match, then skip that number of characters in the character buffer.
    208: If no match, then indicate and revert to Stage 1 processing (checking validity of XML names and using SymbolTable).

OPTIMIZED MARKUP LANGUAGE PROCESSING USING REPEATED STRUCTURES IN MARKUP LANGUAGE SOURCE

TECHNICAL FIELD

The present invention is in the field of markup language (such as XML) parsing and, in particular, relates to an optimization related to recognizing repeated structures in markup language source.

BACKGROUND

Generally speaking, a parser is a program to check whether an input file has the correct grammar for the language, and also to build a data structure describing the program. For example, the input file may be in a markup language such as XML (Extensible Markup Language). By contrast to computer languages such as C or Pascal, the result of processing a markup language input file is typically not executable code. Rather, the result of processing a markup language input file typically includes tagged text. For example, XML provides for the creation of customized tags, enabling the definition, transmission, validation, and interpretation of data between applications and between organizations.

FIG. 1 illustrates an example of an excerpt from an XML source file. The excerpt defines a table record with two row records. The text of the form <X> and </X> are start and end tokens (tags), respectively, which indicate the start and end of a record. It can be seen from FIG. 1 that the records may be nested such that tags are provided at various depths. More particularly, a subsequent start token may be provided before a matching end token is provided for a preceding start token.

Referring to the FIG. 1 example, and taking the <table> token as being at depth 1, the <row> token is at depth 2, and the <id>, <firstname>, <lastname>, <street>, <city>, <state> and <zip> tokens are at depth 3. The FIG. 1 example is a relatively simple one. However, the structures may be arbitrarily complex, so long as the nesting rules are met (i.e., that an end token is provided matching the last provided start token, before any other end token is provided).

FIG. 2 illustrates the contents of a character array buffer, corresponding to the XML source file excerpt in FIG. 1. Conventionally, an XML stream is loaded into such a character array buffer, and the stream is parsed from the character buffer.

With reference to the pseudo code in FIG. 3, we now describe a conventional parsing flow, for parsing a markup language stream (using XML as a specific example). In the main XML parser, at step 1, the XML stream is loaded into the character array buffer (such as is shown in FIG. 2). At step 2, the stream is processed until the start of a new element is detected. In this case, the start of the new element is a start tag, delimited by "<" and ">."

At step 3, the process_element( ) process (also shown in FIG. 3) is called. Finally, at step 4, processing continues until either the start of a new element is detected or processing of the source file is finished. If a new element is detected, then processing returns to step 3 (indicated by the step label "new_element").

We now discuss the process_element process, with reference still to FIG. 3. As just described, the process_element process is called by the main XML parser program process. In addition, as will be described, the process_element process is also called recursively.

At step 1 of the process_element process, the start tag is read for the element being processed. At step 2 of the process_element process, the get_stringobject process is called to get a string object, from a symbol table, for the string. The get_stringobject process will be described in greater detail below. At step 3 of the process_element process, the string object is pushed onto a stack. Finally, at step 4, processing continues until a new element is detected, in which case the process_element process is called recursively, or the end of the element is detected. If the end of the element is detected, then the string object for the element is popped off the stack and processing returns to the calling program (which, it should be recalled, may be the process_element process itself).

We now describe the get_stringobject process, still with reference to FIG. 3. In the get_stringobject process, each character of the start string is checked to determine that it is a valid XML character according to the XML 1.0 specification. At step 2, the symbol table is checked to determine whether there is already a string object for the start string. At step 3, if there is already a string object for the start string in the symbol table, then the already-present string object is returned as the result of the get_stringobject process. Otherwise, a new string object is created in the symbol table for the start string, and the newly-created string object is returned as the result of the get_stringobject process.

Referring specifically to XML, but also relevant to other markup languages, there are at least two relatively "expensive" (i.e., that take lot of time and/or processing power) functions that the parser performs. Two such functions dealt with here are within the get_stringobject processing. One such expensive function is checking that each character of the start string is a valid XML character. Another expensive function is checking the symbol table to determine whether there is already a string object for the start string, particular as the number of string objects referenced in the symbol table increases.

SUMMARY

A computer-implemented method of parsing markup-language source data is described. The markup-language source data comprises a plurality of elements. A first portion of the elements is processed by interoperating with a symbol table to determine unique string objects associated with the elements of the first portion of the elements. A structure is recorded associated with the first portion of the elements collectively, including the determined unique string objects in association with the corresponding elements of the first portion. A second portion of the elements is processed, using the structure determined associated with the first portion of the elements, to determine the unique string objects associated with the elements of the second portion, without interoperating with the symbol table.

BRIEF DESCRIPTION OF FIGURES

FIG. 1 illustrates an input markup language source file.

FIG. 2 illustrates contents of a character array buffer for a portion of the FIG. 1 input markup language source file.

FIG. 3 illustrates a conventional prior art parsing flow for a markup language source file.

FIG. 4 illustrates an array data structure useable to record a structure associated with processing a first portion of elements in an input markup language source file.

FIG. 5 illustrates an example of improved get_stringobject processing.

DETAILED DESCRIPTION

It is desirable to make markup language processing more efficient. In accordance with an aspect described herein, the string processing is streamlined, based on the property of many markup language source files that there are repeating structures of elements. Broadly speaking, by recognizing that elements are repeated in a particular pattern, some processing related to that pattern can be carried out only once, when the pattern is first encountered.

FIG. 4 illustrates a particular example of structure used to capture an initial instance of a pattern captured by the parser processing. The FIG. 4 data structure is an array, but other suitable data structures may be employed, such as a linked list data structure. FIG. 5 illustrates processing that refers to the captured initial instance to streamline subsequent encounters of the same pattern instance.

Referring first to FIG. 5, the pseudo code in this figure is an improved version of the conventional get_stringobject process. As can be seen from FIG. 5, the new get_stringobject process, when invoked with a start string, processes either in Stage 1 or Stage 2. Stage 1 processing is used to carry out processing, typically "expensive" processing as discussed above in the Background, for what may be determined to be a first instance of a pattern of instances. Stage 2 processing is used to carry out processing of what are nominally subsequent encounters of the first instance.

Thus, referring to the Stage 1 processing, it can be seen that steps 102, 104 and 106a and 106b (FIG. 5) are the same as steps 1, 2 and 3a and b in the conventional get_stringobject processing shown in FIG. 3. Step 106c processing populates a data structure, such as the FIG. 4 array, with information of an initial instance. This includes saving an indication of the string object (for example, a link to the string object in the symbol table) in association with the start string.

At step 106d, when a particular condition is met (indicative of what is nominally the end of a first pattern instance), it is indicated that further invocations of the get_stringobject processing are to be in Stage 2 (to carry out processing of what are nominally subsequent encounters of the first instance). That is, further invocations of the get_stringobject processing refer to the data structure populated in Stage 1.

We now refer to the Stage 2 processing in FIG. 5. At step 202, the next element to be read is predicted using the entries in the data structure. Put another way, assuming that the Stage 2 processing is for a subsequent processing of a pattern instance, the data structure is accessed in place of the expensive processing of the symbol table. At step 204, the start tag string is compared to the predicted next element (result from step 202).

If there is a match at step 206, then the number of characters from the character buffer can be skipped. That is, as a result, the processing to check each character of the start tag for validity with respect to the XML 1.0 specification, as well as the processing of the symbol table to check for and obtain the string object (and perhaps even create the string object), is replaced by a simple compare and simple access of the string object using the pointer in the data structure. At step 208, if there is no match, then it is indicated that further invocations of the get_stringobject processing are to use Stage 1 processing, and the string object for the present start tag is processed using Stage 1 processing as well.

We now more particularly discuss what is meant, in one example, by a particular condition being meant so that subsequent invocations of the get_stringobject processing are to be in Stage 2. Referring again to FIG. 4, this array data structure stores information about start element tokens in sequence as they are encountered.

In the FIG. 4 example, position 0 includes the "table" token, indicated as being at depth 1; position 1 includes the "row" token, indicated as being at depth 2; position 2 includes the "id" token, indicated as being at depth 3; position 3 includes the "firstname" token, indicated as also being at depth 3; etc.

It is noted that depth increases when the elements are encountered. In addition, two variables are maintained:

---
fLastDepth = depth of last start tag opened.
fDepth = current depth
---

A decrease of depth means that a subtree has been read. The test for the particular condition which the parser uses as a signal to invoke Stage 2 processing includes if (flastDepth>fdepth && fDepth<=3){

Thus, for example, when "firstname" is encountered, flastDepth=3, and firstname is also at depth 3, so the condition is not met. The current element is added to the array data structure. (In one example, such processing will continue until twenty element have been encountered, which is the size of the array. The limit is configurable. That is, analysis stops if a pattern is not discerned within a set amount of encountered elements.)

According to the condition discussed above, the parser will invoke Stage 2 processing only when there is decrease in depth two times, adjacently. Thus, for example, Stage 2 processing would be invoked with a structure like:

---
```
<a>
  <b>
    <c> </c>
  </b>
  <b>
    <c> </c>
  </b>
</a>
```
---

Note the decrease in depth two times, adjacently, at the end tokens for "c" and "b."

By contrast, Stage 2 processing would not be invoked with a structure like:

---
```
<a>
  <b></b>
  <b></b>
  <b></b>
  <b></b>
</a>
```
---

Stage 2 processing also would not be invoked for a structure like:

---
```
<table>
  <row/>
  <row>
    <id>0001</id>
    <firstname>Bob</firstname>
    <lastname>Aranow</lastname>
```

-continued

```
        <street>2 Any St.</street>
        <city>Anytown</city>
        <state>AL</state>
        <zip>22000</zip>
      </row>
      <row>
        <id>0001</id>
        <firstname>Bob</firstname>
        <lastname>Aranow</lastname>
        <street>2 Any St.</street>
        <city>Anytown</city>
        <state>AL</state>
        <zip>22000</zip>
      </row>
      ...
      ..
    </table>
```

In particular, it should be noted that the elements will be stored in the array data structure as "table", "row", "row", "id", "firstname" and "lastname." Since two "row" elements are stored, the document structure is not repeated such that it is appropriate to invoke Stage 2 processing.

In some examples, a stack data structure is used to track open start tags. Thus, for example, when a start tag is encountered, an indication of the start tag is pushed onto the stack data structure and, when an end tag is encountered, the start indication of the tag (to which that encountered end tag corresponds) is popped off the stack data structure. Thus, the contents of the stack data structure is dynamic such that, for example, when the parser encounters the first </id> end tag (FIG. 1 input source file) and before processing the </id> end tag, the stack data structure will include indications of [table, row, id]. As another example, when the parser encounters the first <firstname> start tag (and after processing the <firstname> start tag), the stack data structure will include indications of [table, row, firstname].

The start tag indications that are pushed onto the stack data structure are the indexes for the start tags an "initial instance" array like the FIG. 4 example array. So, for example, the content of the stack data structure would be [0,1,2] when encountering and before processing the </id> end tag. As another example, the content of the stack data structure would be [0,1,3] when encountering (and after processing) the <firstname> start tag.

The stack data structure may be referred to when going into "fallback mode" (e.g., step 208 of the NEW GET_STRINGOBJECT processing shown in FIG. 5), that indicates "If no match, then indicate and revert to Stage 1 processing." More particularly, the Stage 1 processing can refer to the stack data structure to know about the element start tags that have not yet been closed. (According to typical markup language specifications, such as XML 1.0, start tags should be closed by corresponding end tags.)

Using the described approach, markup language processing may be made more efficient, by recognizing repeating structures of elements and, based thereon, streamlining the string processing.

What is claimed is:

1. A computer-implemented method of parsing markup-language source data in a markup-language source file, comprising a plurality of elements, the method comprising:

processing, utilizing at least one processing unit, a first portion of a plurality of elements in a markup-language source file, including interoperating with a symbol table to determine unique string objects associated with the elements of the first portion of the elements;

recording a structure associated with at least a subset of the first portion of the elements collectively in a computer-readable media, including the determined unique string objects in association with the corresponding elements of the at least a subset of the first portion wherein;

recording the structure includes populating a data structure to be indicative of the structure, including associating, with each element of the first portion, the unique string object for that element as determined from interoperating with the symbol table; and processing, utilizing the at least one processing unit, a second portion of the elements in the markup-language source file, using the determined structure, to determine the unique string objects associated with the elements of the second portion, without interoperating with the symbol table.

2. The method of claim 1, wherein:

processing the second portion of the elements in the markup-language source file includes, for each element, determining a predicted element from the populated data structure; and comparing that element to the predicted element; if the result of the comparison is true, for that element, using the unique string object, from the populated data structure, associated with the predicted element.

3. The method of claim 1, wherein populating the data structure to be indicate of the structure includes associating, with each element of the first portion, a depth indication for that element.

4. The method of claim 1, wherein:

processing the first portion of the elements in the markup-language source file further includes determining whether the recorded structure associated with the first portion of elements collectively meets a particular condition.

5. The method of claim 1, wherein:

processing the first portion of the elements in the markup-language source file further includes when it is determined that the recorded structure associated with the first portion of elements collectively meets a particular condition, indicating that a next portion of the elements is to be treated as the second portion of the elements, such that the second portion of the elements is processed using the structure determined associated with the first portion of the elements.

6. The method of claim 5, wherein:

populating the data structure to be indicate of the structure includes associating, with each element of the first portion, a depth indication for that element; and determining whether the recorded structure associated with the first portion of elements collectively meets a particular condition includes processing the depth indications for the elements of the first portion.

7. The method of claim 6, wherein:

processing the depth indications for the elements of the first portion includes determining whether the depth indications for the elements of the first portion indicate the depth has decreased with a particular number of sequential closing elements.

8. The method of claim 7, wherein:

the particular number of sequential elements is two.

9. The method of claim 7, wherein:

processing the depth indications for the elements of the first portion includes determining whether the depth indication of the last encountered closing element is greater than the depth indication of the last encountered starting element.

10. The method of claim 1, wherein:

processing the first portion of the elements in the markup-language source file includes validating that each character of the elements of the first portion of elements meets a particular specification; and processing a second portion of the elements in the markup-language source file does not include validating the each character of the second portion of elements meets the particular specification.

11. The method of claim 10, wherein:

the particular specification is a markup language specification.

12. The method of claim 11, wherein:

the markup language specification is an XML 1.0 specification.

13. The method of claim 1, further comprising:

during processing the second portion of the elements in the markup-language source file, determining that the second portion of the elements does not have the determined structure; and treating subsequent elements as a new first portion of the elements.

14. The method of claim 1, wherein:

the data structure is an array data structure.

15. The method of claim 1, wherein:

the data structure is a linked list data structure.

* * * * *